United States Patent
Hickman et al.

(10) Patent No.: US 8,922,576 B2
(45) Date of Patent: *Dec. 30, 2014

(54) SIDE-BY-SIDE AND SYNCHRONIZED DISPLAYS FOR THREE-DIMENSIONAL (3D) OBJECT DATA MODELS

(71) Applicant: Google Inc., Mountain View, CA (US)

(72) Inventors: Ryan Hickman, Mountain View, CA (US); James J. Kuffner, Jr., Mountain View, CA (US); Anthony Gerald Francis, Jr., San Jose, CA (US); Arshan Poursohi, Berkeley, CA (US); James R. Bruce, Sunnyvale, CA (US); Thor Lewis, San Francisco, CA (US); Chaitanya Gharpure, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,889

(22) Filed: May 22, 2014

(65) Prior Publication Data

US 2014/0253546 A1 Sep. 11, 2014

Related U.S. Application Data

(63) Continuation of application No. 13/644,488, filed on Oct. 4, 2012, now Pat. No. 8,766,997.

(60) Provisional application No. 61/558,897, filed on Nov. 11, 2011.

(51) Int. Cl.
G09G 5/00 (2006.01)
G06T 19/20 (2011.01)
G06T 17/00 (2006.01)

(52) U.S. Cl.
CPC ........ *G06T 19/20* (2013.01); *G09G 5/00* (2013.01); *G06T 17/00* (2013.01); *G06T 2219/2004* (2013.01)
USPC ............................ 345/561; 345/420; 345/619

(58) Field of Classification Search
USPC .......................................... 382/103; 345/156
See application file for complete search history.

(56) References Cited

U.S. PATENT DOCUMENTS

2005/0267900 A1  12/2005  Ahmed et al.

(Continued)

OTHER PUBLICATIONS

Autodesk 123D Catch, Catch and carry, Turn ordinary photos into extraordinary 3D models, www.123dapp.com/catch, 2013.
Kim, Vladimir G. et al., "Blended Intrinsic Maps", ACM Transactions on Graphics, Jul. 2011.

(Continued)

*Primary Examiner* — Phi Hoang
(74) *Attorney, Agent, or Firm* — McDonnell Boehnen Hulbert & Berghoff LLP

(57) ABSTRACT

Methods and systems for interacting with multiple three-dimensional (3D) object data models are provided. An example method may involve providing to a display device for display a first 3D object data model and a second 3D object data model. Information associated with a modification to the first 3D object data model may be received. Based on the received information, a same change may be applied to the first 3D object data model and applied to the second 3D object data model to obtain a first modified 3D object data model and a second modified 3D object data model. According to the method, the first modified 3D object data model and the second modified 3D object data model may be provided to the display device for substantially simultaneous display.

20 Claims, 13 Drawing Sheets

(56) References Cited

U.S. PATENT DOCUMENTS

| | | |
|---|---|---|
| 2007/0216642 A1 | 9/2007 | Kneissler |
| 2007/0256053 A1* | 11/2007 | Torgerson et al. ............ 717/110 |
| 2009/0129630 A1 | 5/2009 | Gloudemans et al. |
| 2010/0138778 A1* | 6/2010 | Dewan et al. ................. 715/789 |
| 2010/0238166 A1 | 9/2010 | Tamstorf et al. |
| 2012/0089542 A1* | 4/2012 | Hettel ............................ 706/12 |

OTHER PUBLICATIONS

Kim, Vladimir G. et al., "Exploring Collections of 3D Models using Fuzzy Correspondences", Transactions on Graphics, Aug. 2012.

Kaick, Oliver Van et al., "A Survey on Shape Correspondence", Computer Graphics Forum, vol. 30, Issue 6, pp. 1681-1707, Sep. 2011.

Lipman, Yaron et al., "Mobius Voting for Surface Correspondence", ACM Transactions on Graphics, Aug. 2009.

* cited by examiner

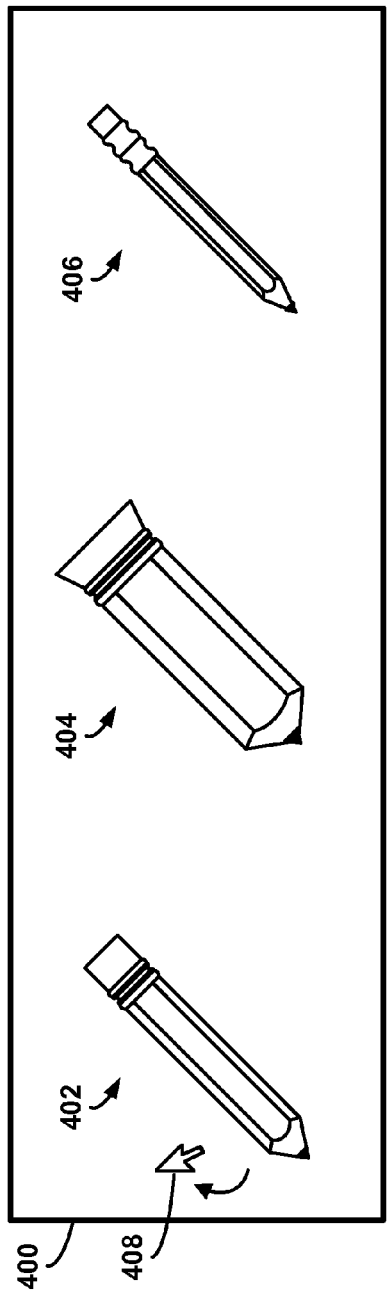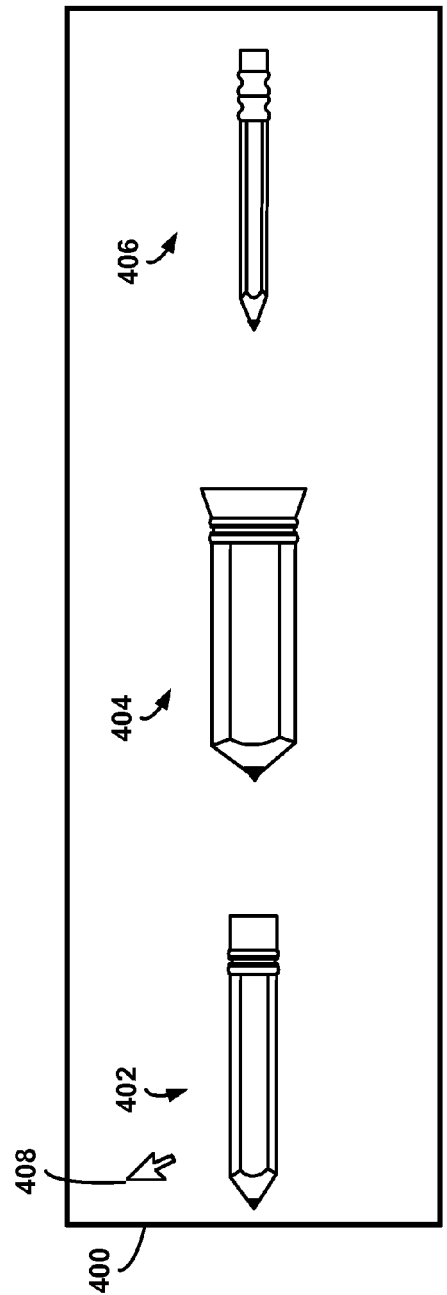

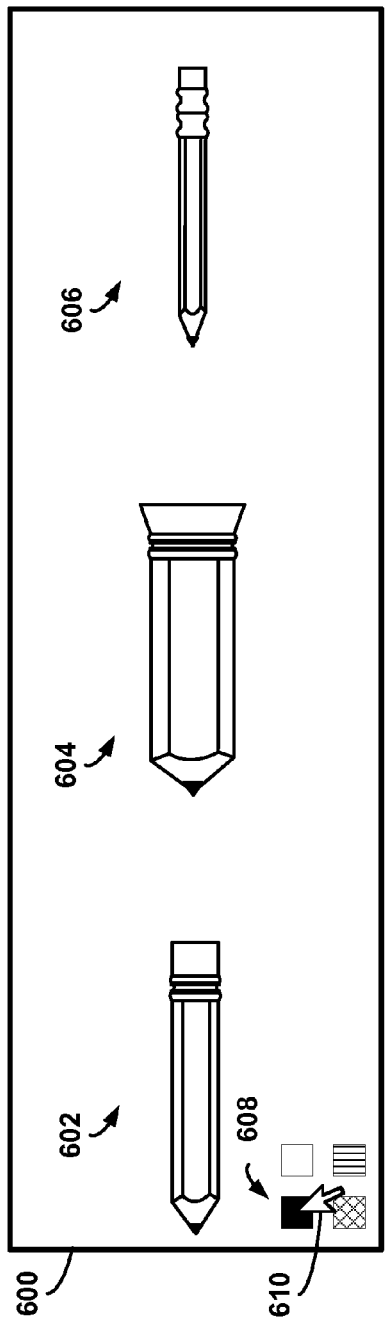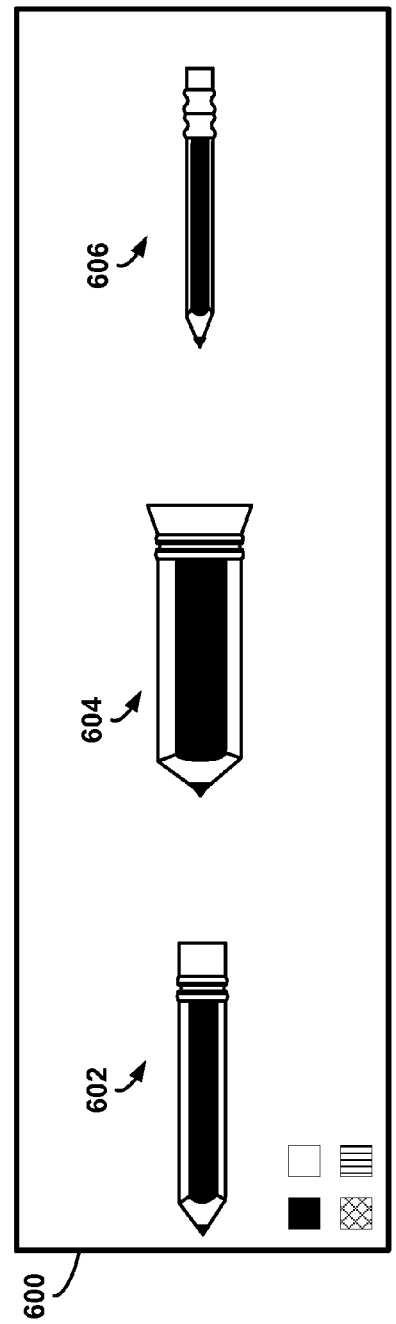

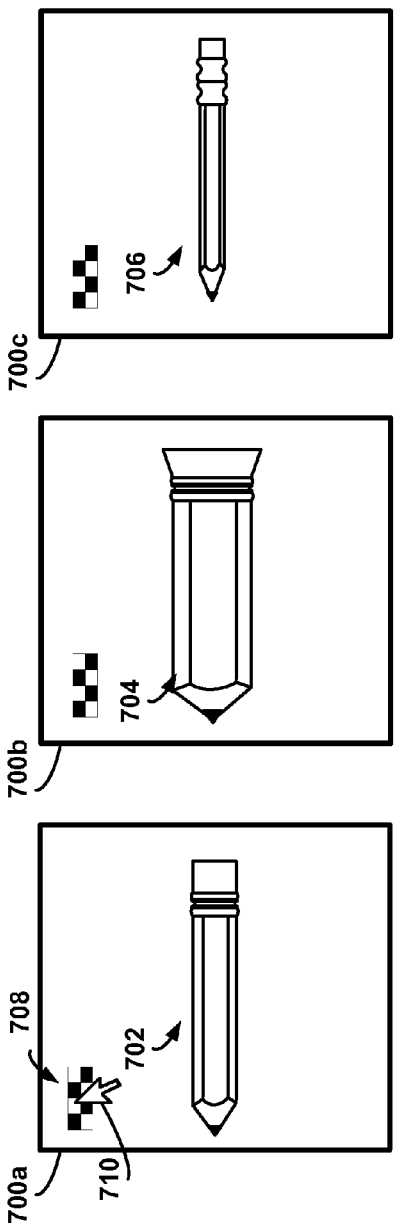
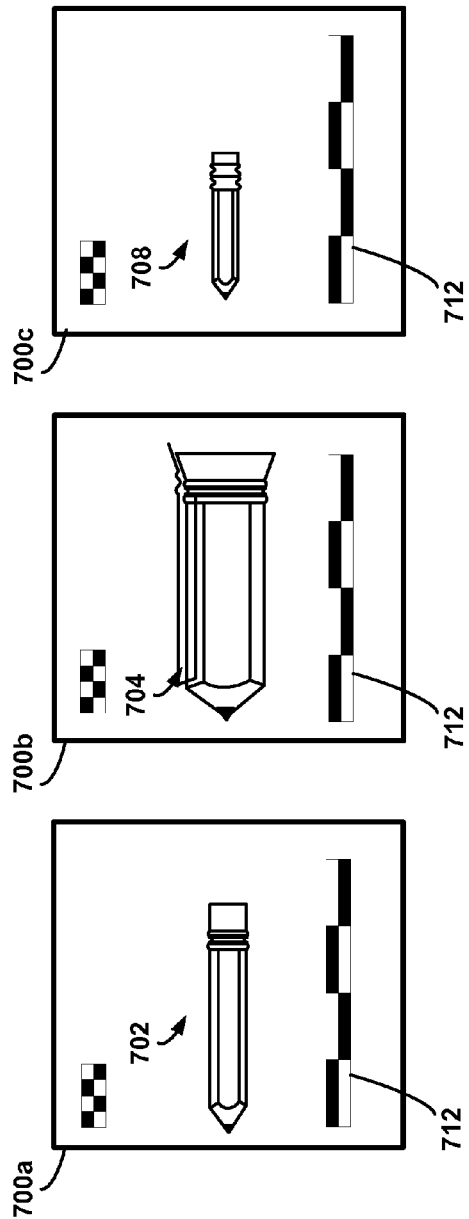

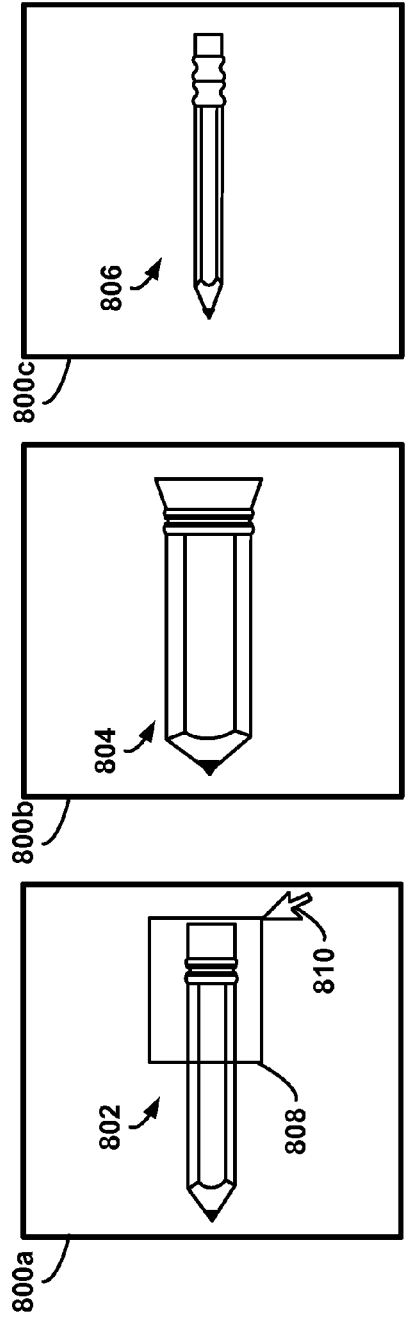
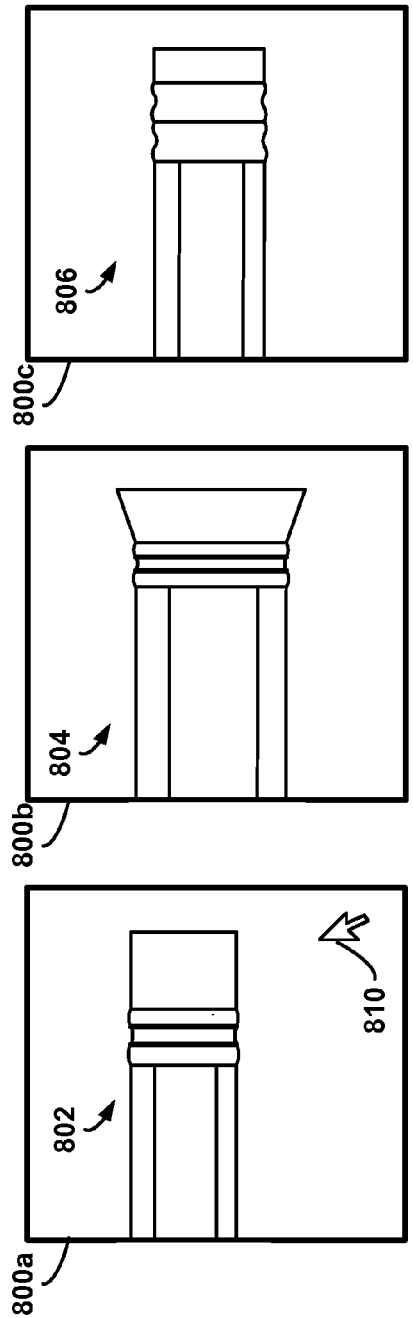
FIGURE 8A
FIGURE 8B

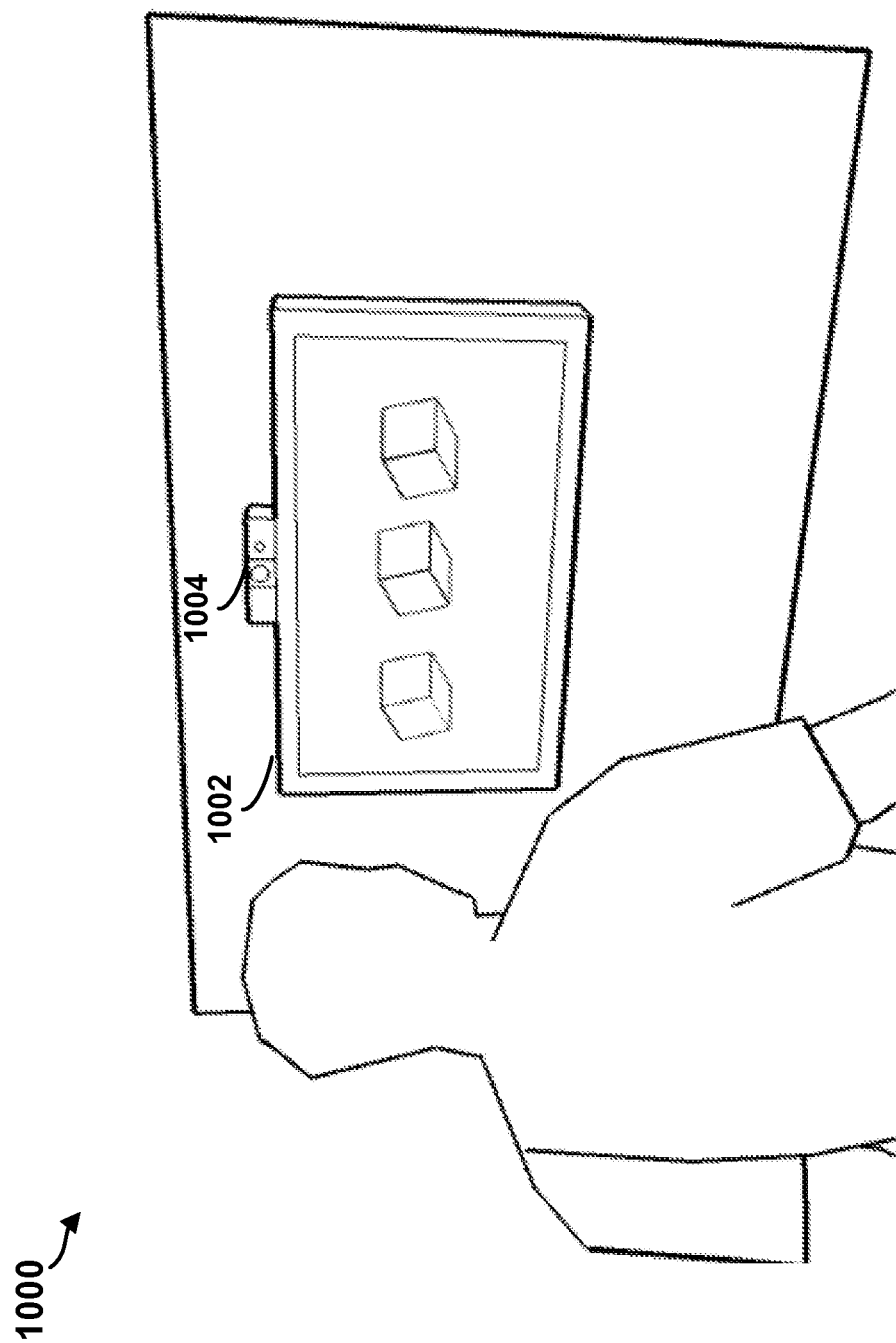

SIDE-BY-SIDE AND SYNCHRONIZED DISPLAYS FOR THREE-DIMENSIONAL (3D) OBJECT DATA MODELS

CROSS-REFERENCE TO RELATED APPLICATIONS

This application is a continuation of U.S. patent application Ser. No. 13/644,488 filed Oct. 4, 2012, the contents of which are hereby incorporated by reference.

This application claims the benefit of U.S. Provisional Application No. 61/558,897 filed on Nov. 11, 2011, the entirety of which is herein incorporated by reference.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or by scanning objects, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

In one example aspect, a method is provided that involves providing to a display device for display a first three-dimensional (3D) object data model and a second 3D object data model. The method also includes receiving information associated with a modification to the first 3D object data model. The method further includes, based on the received information, applying a same change to the first 3D object data model and the second 3D object data model to obtain a first modified 3D object data model and a second modified 3D object data model. According to the method, the first modified 3D object data model and the second modified 3D object data model may be provided to the display device for substantially simultaneous display.

In another example aspect, a computer-readable medium having stored therein instructions, that when executed by a computing device, cause the computing device to perform functions is provided. The functions may involve providing to a display device for display a first three-dimensional (3D) object data model and a second 3D object data model. Additionally, the functions may include receiving information associated with a modification to the first 3D object data model. The functions may also include, based on the received information, applying a same change to the first 3D object data model and the second 3D object data model to obtain a first modified 3D object data model and a second modified 3D object data model. According to the functions, the first modified 3D object data model and the second modified 3D object data model may be provided to the display device for substantially simultaneous display.

In still another example aspect, a system is provided that comprises a display device, an input interface, and a rendering component. The display device may be configured to display a first 3D object data model and a second 3D object data model. The input inference may be configured to obtain information associated with a modification to the first 3D object data model. The rendering component may be configured to apply the modification to the first 3D object data model to obtain a first modified 3D object data model and apply the modification to the second 3D object data model to obtain a second modified 3D object data model. The rendering component may be further configured to cause the display device to substantially simultaneously display the first modified 3D object data model and the second modified 3D object data model.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 4A and 4B show example displays of multiple three-dimensional (3D) object data models.

FIGS. 6A and 6B also show example displays of multiple three-dimensional (3D) object data models.

FIGS. 7A and 7B also show example displays of multiple three-dimensional (3D) object data models.

FIGS. 8A and 8B also show example displays of multiple three-dimensional (3D) object data models.

FIG. 10 is a conceptual illustration of an example display including representations of displays of multiple three-dimensional (3D) object data models.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for interacting with multiple three-dimensional (3D) object data models. In one example, a first and second 3D object data model may be provided to a display device for rendering. Additionally, functionality may be provided to control the first and second 3D object data models simultaneously. As one example, multiple 3D object data models may be displayed on a user interface in a side-by-side comparison view. Control functions may be provided such that changes made to a display of one 3D object data model are also applied to the display of other 3D object data models in the comparison view.

In one scenario, a user viewing a 3D object data model of a mobile phone on a shopping website may wish to compare the mobile phone to other phone models. A user may select one or more additional 3D object data models for comparison with the mobile phone. A user interface may display a 3D object data model for each selected phone model. The user interface may provide functionality to manipulate, modify, or change a display of the 3D object data models.

In one example, the user interface may display the multiple 3D object data models for the selected mobile phones simultaneously. Modifications made by a user to a display of one 3D object data model may be used as instructions to control a display of the other 3D object data models, such that the displays of the 3D object data models mimic each other. In this manner, manipulation of a given 3D object data model may result in multiple 3D object data models being manipulated in the same way for better comparisons. For example, zooming in on one 3D object data model may cause views of the other 3D object data models to also be zoomed in on in corresponding areas. Thus, 3D object data models of multiple objects may be provided, and views of the multiple objects may be synchronized.

Figure 1:
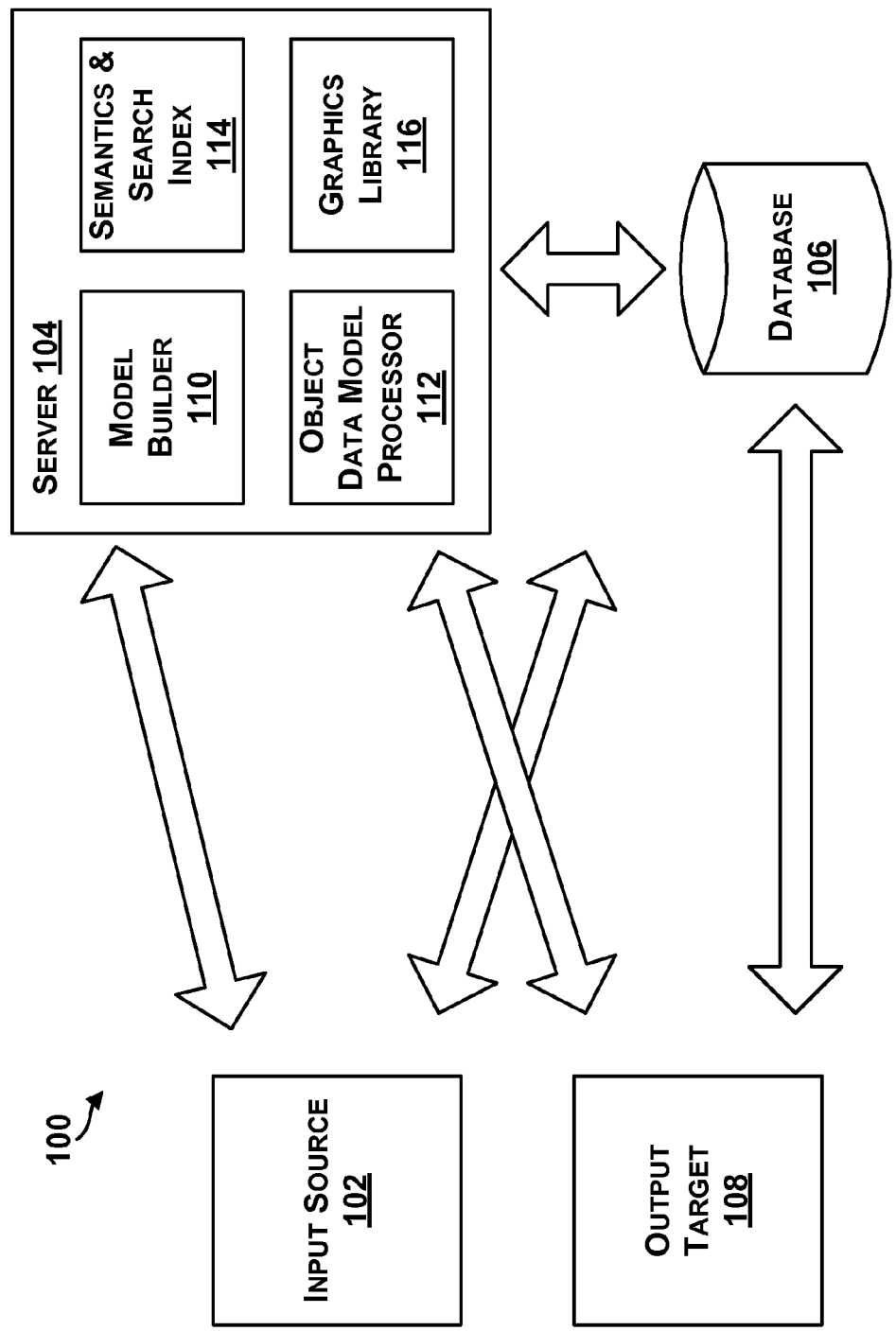
FIG. 1 illustrates an example system for object data modeling.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (e.g., a Wi-Fi network), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no UV unwrapping to generate a mesh (D) with UV unwrapping but no colors. UV unwrapping refers to the unwrapping of a 3D mesh to a 2D space for texturing purposes, where the 2D space is denoted, by convention, with "u" and "v" coordinates since "x", "y", and "z" are used for 3D space. As an example, for a single output texture pixel of an image, processing may include, for a given point in UV, determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions. As an example, a hood on a car may include a hood ornament, and the hood may be painted while the ornament may have a chrome finish. The materials application 120 and the shader application 118 can be executed to identify two separate materials (e.g., the painted hood and the chrome hood ornament) and render each material with an appropriate shader.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display. As described previously, in some instances, controls functions may be provided such that views of multiple 3D object data models that are displayed by a display device may be synchronized.

Figure 2:
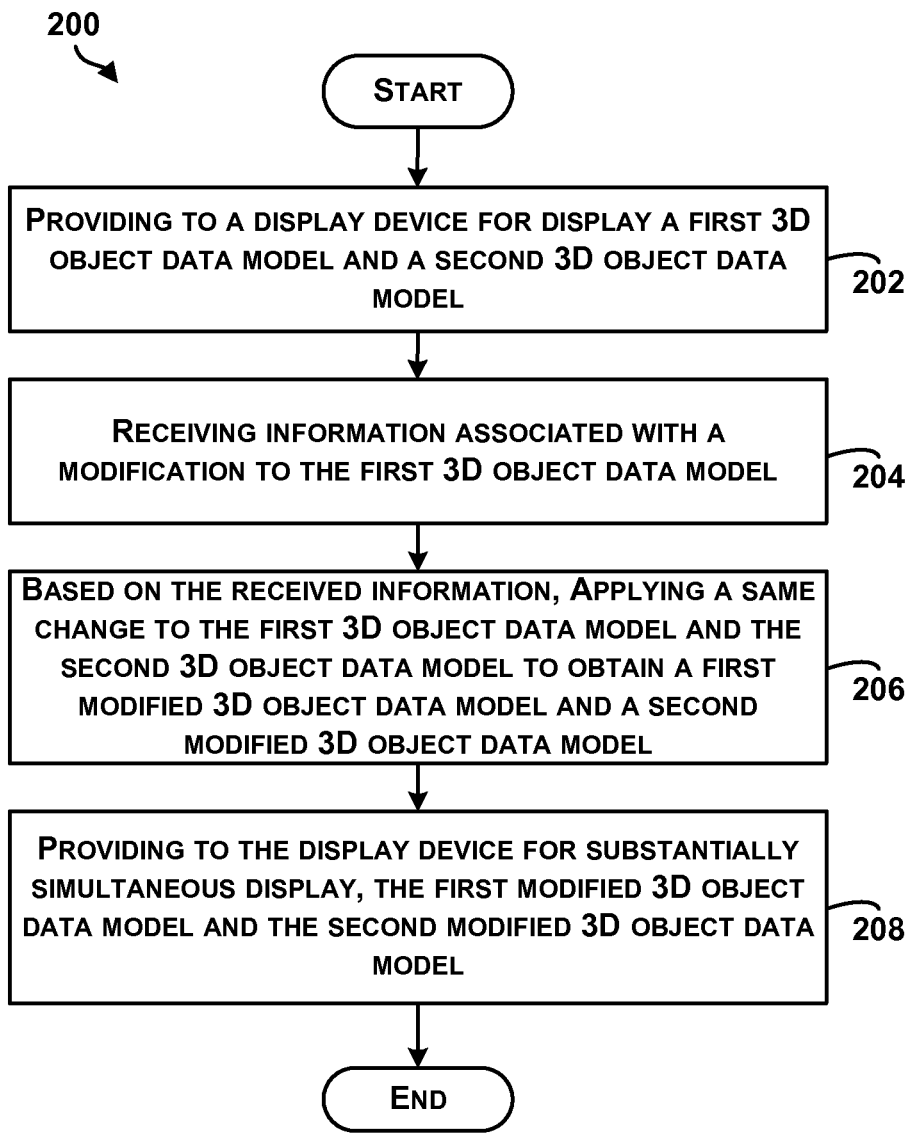
FIG. 2 is a block diagram of an example method for interacting with multiple three-dimensional (3D) object data models.

FIG. 2 is a block diagram of an example method 200 for interacting with multiple three-dimensional (3D) object data models. Method 200 shown in FIG. 2 presents an embodiment of a method that could be used by the system 100 of FIG. 1 or components of the system 100, for example. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 202, the method 200 includes providing to a display device for display a first 3D object data model and a second 3D object data model. The display device may be any type of a display, such as a monitor, television, tablet computer, laptop computer, mobile phone, a display associated with a wearable computing device, etc. Additionally, information associated with rendering the first 3D object data model and the second 3D object data model may be provided by a server or retrieved from a local memory coupled to the display device.

The first 3D object data model and the second 3D object data model may be 3D object data models of any type of object (e.g., a phone, computer, or electronic device, article of clothing, statue, toy, or any other type of product). In some examples, the first 3D object data model and the second 3D object data model may be 3D object data models of the same instance of an object represented according to various material, color, or textural appearances (e.g., the first 3D object data model may represent the object rendered having a first material while the second 3D object data model may represent the same object rendered having a second material). In other examples, the first 3D object data model and the second 3D object data model may each be different styles or types of the same object (e.g., the first 3D object data model may be a phone that is manufactured by a first company and the second 3D object data model may be a phone that is manufactured by a second company).

The first 3D object data model and the second 3D object data model need not each be of the same type of object, however. For instance, the first 3D object data model and the second 3D object data model may broadly represent any two objects having a correspondence between orientation. As an example, point correspondences between two surface meshes (e.g., a first surface mesh of the first 3D object data model and a second surface mesh of the second 3D object data model) that are approximately and/or partially isometric may be determined. In one instance, this may be possible due to intrinsic shapes that may be common to objects of the same class. For example, correspondences may be found between a dog and a wolf or between a first type of chair and a second type of chair that each have four legs and a back. Given the correspondences between orientations, the first 3D object data model and second 3D object data model may be aligned such that the first 3D object data model and second 3D object data model are each displayed having a similar pose within a common 3D reference system. In other examples, the first 3D object data model and the second 3D object data model need not have any correspondences between orientation.

In one example, the first 3D object data model and the second 3D object data model may be provided side-by-side (e.g., horizontally or vertically adjacent), within the same window or within adjacent separate windows, on the display device. In another example, the first 3D object data model and the second 3D object data model may be provided within a common 3D scene. For instance, the first 3D object data model and the second 3D object data model may be provided such that the first 3D object data model and the second 3D object data model may be rendered on a counter or on shelves of a shopping rack. In yet another example, the first 3D object data model and/or the second 3D object data model may be semitransparent, and the first 3D object data model may overlay the second 3D object data model.

At block 204, the method 200 includes receiving information associated with a modification to the first 3D object data model. For instance, the modification may be received based on an input provided by a user to a user interface. In one example, the user may provide the input using a mouse and/or keyboard. In other examples, the user may provide an input using a touchscreen. Other example inputs are also possible, such as gestures recognized by a camera or modifications received by way of any type of input interface.

The information associated with the modification to the first 3D object data model may include a change in pose, a change in level of zoom, a change in aspect ratio, a change in texture, a change in lightning, a change in scale, an initiation of an animation sequence, a change in background, or any type of modification to the 3D object data model. For instance, a user may click and drag the first 3D object data model to rotate the 3D object data model or scroll a wheel to zoom in or out on the first 3D object data model. Example modifications are further described below.

At block 206, the method 200 includes based on the received information applying a same change to the first 3D object data model and the second 3D object data model to obtain a first modified 3D object data model and a second modified 3D object data model. In one example, information associated with a modification to the first 3D object data model may be provided to a communication module that provides the information associated with the modification to rendering components that are configured to control rendering of each of the first 3D object data model and the second 3D object data model. For example, an input received by an input interface may be provided as instructions to a rendering component that provides information for rendering the first 3D object data model and the second 3D object data model. The rendering component may render a modified first 3D object data model and modified second 3D object data model based on the instructions. In some examples, the modification may be translated into a common unit, such as an amount of rotation or an amount of zoom that is provided to the rendering component. Thus, a same change may be applied to the first 3D object data model and the second 3D object data model.

In another example, a user interface may be configured such that any input provided with respect to the first 3D object data model is also received by a handler that controls modifications of the second 3D object data model and vice versa. For example, each of the first 3D object data model and the second 3D object data model may be configured to receive modifications individually. In an instance in which a modification is provided to the first 3D object data model, the modification may be provided as instructions to a rendering component for determining a first modified 3D object data model. Simultaneously, the instructions may also be provided to a second rendering component for determining a second modified 3D object data model. In some examples, the rendering component may apply a same change to both of the first 3D object data model and the second 3D object data model. For instance, the change may be an amount of rotation, a level of zoom, an aspect ratio, a color change, or other possible changes.

At block 208, the method 200 includes providing to the display device for substantially simultaneous display, the first modified 3D object data model and the second modified 3D object data model. In one example, in response to receiving information associated with the modification to the first 3D object data model, after the first modified 3D object data model and second modified 3D object data model have been determined, information associated with rendering the first modified 3D object data model and the second modified 3D object data model may be provided to the display device. In some instances, determining the first modified 3D object data model and the second modified 3D object data model may occur within a short time frame (e.g., less than a second) such that when the modification to the first 3D object data model is received, the information for rendering the first modified 3D object data model and the second modified 3D object data model may be provided to the display device substantially thereafter with no discernible delay between receiving the modification and updating the first 3D object data model and the second 3D object data model.

Figure 3:
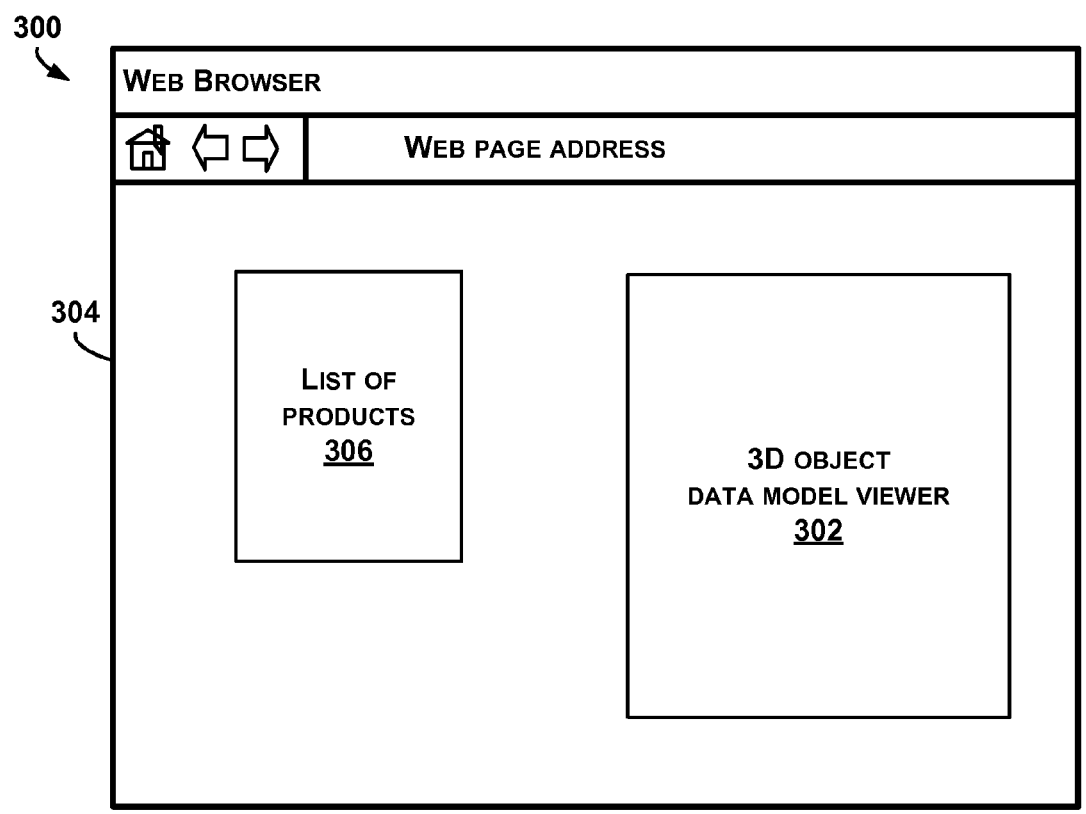
FIG. 3 is a conceptual illustration of an example web browser including a three-dimensional (3D) object data model viewer.

FIG. 3 is a conceptual illustration of an example web browser 300 including a three-dimensional (3D) object data model viewer 302. In some examples, the 3D object data model viewer 302 may be embedded within a webpage 304. For example, the webpage 304 may be a shopping website allowing comparisons of multiple products.

In one instance, products on the webpage 304 may have 3D object data models associated with the products, and a user may select multiple instances of a product (e.g., multiple styles or models of a product) and/or multiple products to compare from a list of products 306. A user interface may provide functionality to select one or more 3D object data models for display. For example, a user may be shopping for a mobile phone on the webpage 304. While viewing a 3D object data model of a mobile phone on the webpage 304, the user may wish to compare the mobile phone to other models of mobile phones. The user interface may display 3D object data models for each selected respective mobile phone. In one example, each respective mobile phone may be displayed side-by-side within one window or section of the 3D object data model viewer 302. In other examples, each respective mobile phone may be displayed within a separate window of the 3D object data model viewer 302 (or within separate 3D object data model viewers).

Additionally, the user interface may provide functionality to manipulate, modify, or change a display of a 3D object data model. The interface may further include functionality such that modifications to one display of a 3D object data model are applied to other 3D object data models. For example, a change to a view of a first 3D object data model of a mobile phone may be simultaneously applied to other models of mobile phones viewable in the 3D object data model viewer 302 such that each of the respective displays of mobile phones mimic each other. Thus, in some instances, a modification to a first 3D object data model may be applied to one or more other 3D object data models viewable on a display.

FIGS. 4A and 4B show example displays of multiple three-dimensional (3D) object data models. In one example, a user interface may include a window 400 displaying multiple 3D object data models simultaneously. As shown in FIG. 4A, the window 400 of the user interface may include representations of three 3D object data models 402, 404, and 406 of pencils. The 3D object data models 402, 404, and 406, may be provided at a first orientation at a first instance in time. A user may interact with the 3D object data model 402 to rotate the 3D object data model 402, for example, by clicking and dragging a cursor 408 on the display. (Although input to the user interface is described with respect to the cursor 408, other example inputs are also contemplated. E.g., the user interface may be configured for a touchscreen device.) The interaction by the user may change a pose (or orientation) of the 3D object data model and/or a camera position from which the 3D object data model is viewed.

As shown in FIG. 4B, representations or views the 3D object data models 402, 404, and 406 may be updated at a second instance in time based on the input received from the user. For example, the 3D object data model 402 may have rotated from the first orientation to a second orientation based on the interaction with the 3D object data model 402 by the user. In addition, the 3D object data models 404 and 406 may have rotated by the same amount in response to the interaction with the model 402 via the cursor 408. Thus, in some examples, a user may rotate one 3D object data model and the rotation may simultaneously be applied to multiple 3D object data models rendered within a display.

Figure 5A:
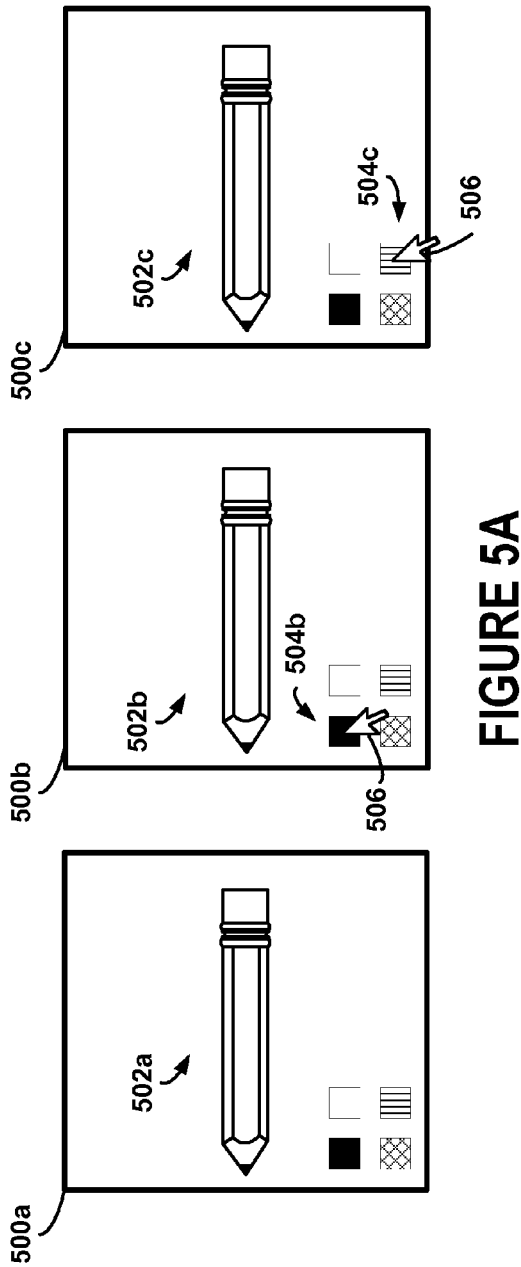
FIGS. 5A and 5B show additional example displays of multiple three-dimensional (3D) object data models.
Figure 5B:
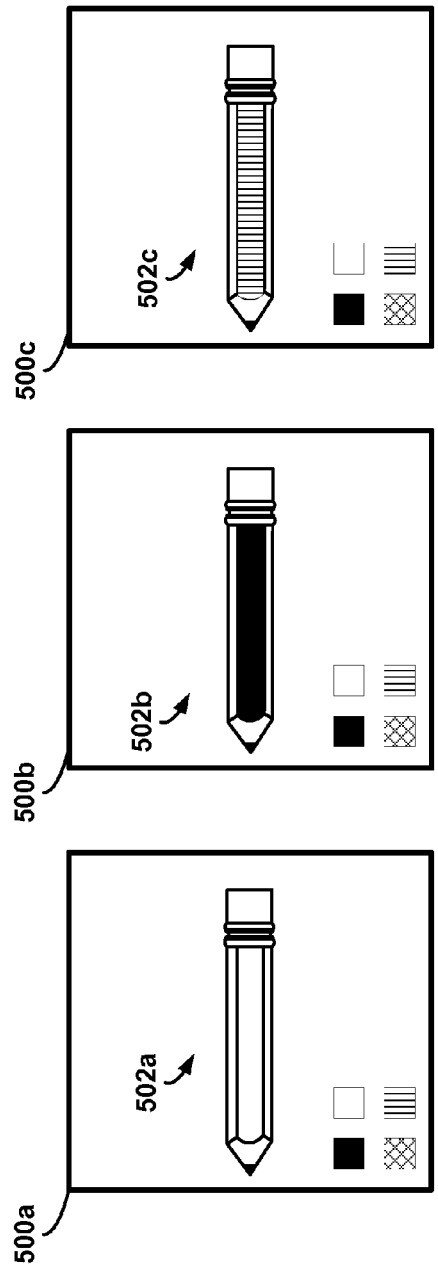

FIGS. 5A and 5B show additional example displays of multiple three-dimensional (3D) object data models. In another example, a user interface may include three separate windows 500a, 500b, and 500c displaying 3D object data models. For example, the three separate windows 500a, 500b, and 500c may display an instance of a 3D object data model of a pencil. In one example, the three separate windows 500a, 500b, and 500c may each display the same instance of a pencil. A user may interact with the user interface to modify an attribute of an instance of the pencil and simultaneously compare a result of the modification to other instances of the pencil. As shown in FIG. 5A, three 3D object data models 502a, 502b, and 502c may be displayed in the windows 500a, 500b, and 500c respectively. In some examples, the user interface may enable a user to select an attribute affecting a color, texture, lighting, material, or other characteristic of a 3D object data model or portion of a 3D object data model. For example, a user may select a first attribute 504b for the 3D object data model 502b from among multiple attributes at a first instance in time. The user may select the first attribute using a cursor 506, for example. A user may also select a second attribute 504c for the 3D object data model 502c at a second instance in time.

As shown in FIG. 5B, the 3D object data models 502b and 502c displayed in the windows 500b and 500c of the user interface may be updated at a third instance in time based on the selected attributes. For example, the second attribute 504b may be applied to the 3D object data model 502b such that the 3D object data model is rendered at the third instance in time according to the second attribute 504b. Thus, in some examples, the user interface may enable side-by-side comparisons of multiple instances of the same 3D object data model having varying attributes. In addition, in some examples, a user may modify a display of any of the 3D object data models and the remaining 3D object data models may be modified in the same manner and updated simultaneously (e.g., a user may rotate the 3D object data model 502a and the 3D object data models 502b and 502c may also rotate in the same manner simultaneously).

FIGS. 6A and 6B also show example displays of multiple three-dimensional (3D) object data models. In another example, a user interface may include a window 600 displaying multiple 3D object data models simultaneously. As shown in FIG. 6A, the window 600 of the user interface may include three 3D object data models 602, 604, and 606 of pencils. In one example, the 3D object data models 602, 604, and 606 may be models of various styles of pencils. As shown in FIG. 6A, the user interface may enable a user to modify an attribute of a 3D object data model such as a color, material, texture, lighting, or other characteristic of the 3D model. For example, a user may select a first attribute 608 via a cursor 610 at a first instance in time.

As shown in FIG. 6B, the 3D object data models 602, 604, and 606 displayed in the window 600 may be updated at a second instance in time based on the selected attribute 608. For example, the selected attribute 608 may be applied to the 3D object data models 602, 604, and 606. Thus, in some examples, the user interface may enable a user to simultaneously compare the effects of modifying the same attribute for multiple styles of an object in a side-by-side comparison.

FIGS. 7A and 7B also show example displays of multiple three-dimensional (3D) object data models. In still another example, a user interface may include three separate windows 700a, 700b, and 700c displaying separate styles of 3D object data models 702, 706, and 708. For example, the three separate windows 700a, 700b, and 700c may each display a separate style of pencil. As shown in FIG. 7A user interface may enable a user to select a scale option 708 via a cursor 710 at a first instance in time.

As shown in FIG. 7B, the windows 700a, 700b, and 700c may be updated at a second instance in time to include a legend 712. The 3D object data models 702, 704, and 706 may also be modified at the second instance in time such that size dimensions of each of the 3D object data models 702, 704, and 706 are held constant relative to a size of the legend 712. In one example, the legend may be of a known length (e.g., 8 inches). Based on information associated with geometries of the 3D object data models 702, 704, and 706, the 3D object data models 702, 704, and 706 may be modified such that the 3D object data models 702, 704, and 706 are rendered to scale. Thus, in some examples, the user interface may enable a user to view a side-by-side comparison of the size of an object relative to other objects. For instance, a user may wish to rotate the 3D object data models 702, 704, and 706, to view a relative thickness of the objects represented by the 3D object models 702, 704, and 706 along a given dimension.

In a further instance, representations of the 3D object data models 702, 704, and 706 may be semitransparent, and a user may reposition the 3D object data models 702, 704, and 706 to overlay one another. For example, the user may select an option via the user interface that causes the 3D object data models 702, 704, and 706 to be stacked on top of each other or a user may drag one of the 3D object data models 702, 704, or 706 on top of another for easy size comparisons.

FIGS. 8A and 8B also show example displays of multiple three-dimensional (3D) object data models. In yet another example, a user interface may include three separate windows 800a, 800b, and 800c displaying separate styles of 3D object data models 802, 806, and 808. For example, the three separate windows 800a, 800b, and 800c may each display a separate style of pencil. As shown in FIG. 8A user interface may enable a user to zoom in on a region 808 of a 3D object data model. For example, a user may click and drag a cursor 810 over a region 808 of a 3D object data model to select an area to zoom in on at a first instance in time.

As shown in FIG. 8B, the windows 800a, 800b, and 800c may be updated at second instance in time such that the 3D models 802, 804, and 806 are zoomed in on the region 808. For example, the 3D object data model 802 may have been zoomed in on. In addition, the 3D object data models 804 and 806 may have been zoomed in on by the same amount on the same region. Thus, in some examples, a user may zoom in on one 3D object data model and the zooming may simultaneously be applied to multiple 3D object data models rendered within a display. In other examples, a user may further modify a 3D object data model, and the modification may be simultaneously applied to the remaining 3D object models (e.g., a user may zoom in, zoom out, rotate, adjust an attribute, etc.)

Figure 9A:
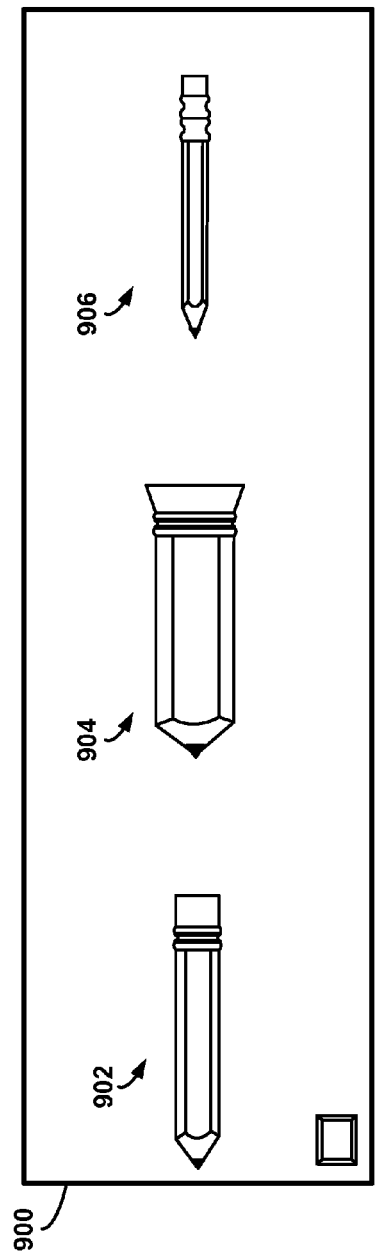
FIGS. 9A and 9B also show example displays of multiple three-dimensional (3D) object data models.
Figure 9B:
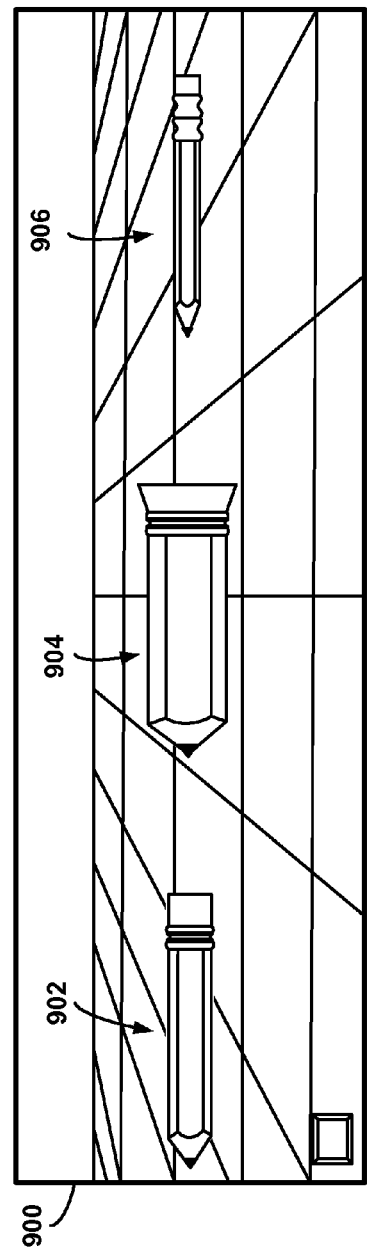

FIGS. 9A and 9B also show example displays of multiple three-dimensional (3D) object data models. In another example, a user interface may include a window 900 displaying multiple 3D object data models simultaneously. As shown in FIG. 9A, the window 900 of the user interface may include three 3D object data models 902, 904, and 906 of pencils. In one example, the 3D object data models 902, 904, and 906 may be models of various styles of pencils.

In some examples, the user interface may enable a user to select a background to apply to the window 900. For example, an option of the user interface may enable a user to select a background image from a database of images or load a custom image. As shown in FIG. 9B, the user interface may enable a user to compare the 3D object data models 902, 904, and 906 against a background image.

In another example, the 3D object data models may include pairs of shoes, and a user may wish to compare the pairs of shoes to a surface or floor by loading an image of the floor. In other examples, the user may wish to compare the pairs of shoes to pairs of pants or other articles of clothing. In some instances, the user interface may enable a user to apply multiple background images to the window 900. For instance, the user interface may enable a user to simultaneously compare multiple instances of the same object against various background images.

In yet another example, the 3D object data models may be mobile phones, and a user may wish to compare the mobile phones to an image of a user. In some instances, a user may further apply the scaling option of the user interface as described with respect to FIGS. 7A and 7B. For example, a user may apply a scaling option such that a user may be able to simultaneously view relative dimensions of the 3D models with respect to a size of a pocket of a user.

It is further contemplated that the user interface may enable a user to modify a lighting attribute of a first 3D object data model and simultaneously apply the lighting attribute to other 3D object data models such that a user may compare multiple 3D object data models under the same lighting characteristics.

In other examples, the user interface may enable a user to apply an animation sequence to a 3D object data model (e.g., a roll, twist, translation from one coordinate position to another coordinate position, etc.), and the animation sequence may simultaneously be applied to multiple 3D object data models. For example, the animation sequence may be an animation sequence selected from a preset group of animation sequences or a custom animation sequence. In one instance, all the 3D object data models could react the same, performing the same animation. In another instance, the 3D object data models could each animate differently based on animations stored with the 3D object data model. For example, the first 3D object data model may be a camera whose animation sequence may involve flashing a flash bulb while a second 3D object data model may be a tripod that may move up and down when animated, adjusting the height of the tripod.

In a further example, the user interface may enable a user to swap 3D object models during an animation sequence. For example, a list or grouping 3D object data models or products associated with 3D object data models may be provided. A user may select a first 3D object data model (or multiple 3D object data models) and an animation sequence, and the 3D object data model may animate according to the animation sequence. During the animation sequence, a user may be able to select a second 3D object data model to replace the first 3D object data model with, and the first 3D object data model within the animation may be swapped out for the second 3D object data model.

In another example, the user interface may enable a user to modify a 3D object data model such that an exploded view of the 3D object data model is displayed. For instance, a first applied modification to a first 3D object data model associated with providing an exploded view may cause each of the 3D object data models to be displayed in an exploded view (if the 3D object data model supports an exploded view).

It is contemplated that any of the example features of the user interfaces as described with respect to FIGS. 4A-9B may be combined. For example, a user interface may enable any combination of rotations, zooms, attribute changes, background changes, animation sequences, etc. to be simultaneously applied to multiple displays of 3D object data models, and the multiple displays may be configured in any number of manners such as side-by-side or in other locations relative to one another.

FIG. 10 is a conceptual illustration 1000 of an example display including representations or displays of multiple three-dimensional (3D) object data models. As shown in FIG. 10, in some examples, multiple 3D object data models may be provided for display on a display device 1002. An input sensor 1004 may be configured to determine information associated with modifications to one of the multiple 3D object data models. For example, the input sensor 1004 may include a camera configured to recognize one or more predetermined hand gestures performed by user. In one scenario, the input sensor 1004 may detect a user's hand and track movements of fingers of the hand or the whole hand to determine whether the movement matches a predetermined gesture. Example gestures may include waving to the left or right, pointing up or down, pinching two or more fingers together, etc. In one example, a user may stand in front of the display device 1002 and perform a gesture to cause a 3D object data model to change pose and rotate. For instance a user may wave their hand to the left.

The display device 1002 may also be configured to accept touch inputs. For instance, the display device 1002 may be a touchscreen display. In other examples, the input sensor 1004 may be configured to determine inputs based on head tracking or eye tracking. For instance, the input sensor 1004 may determine a gaze direction based on a 3D pose of a user's head or movement of a user's eyes. In one instance a user may gaze in the direction of a button or other location on the display device 1002 to apply a modification to one or more of the 3D object data models.

Figure 11A:
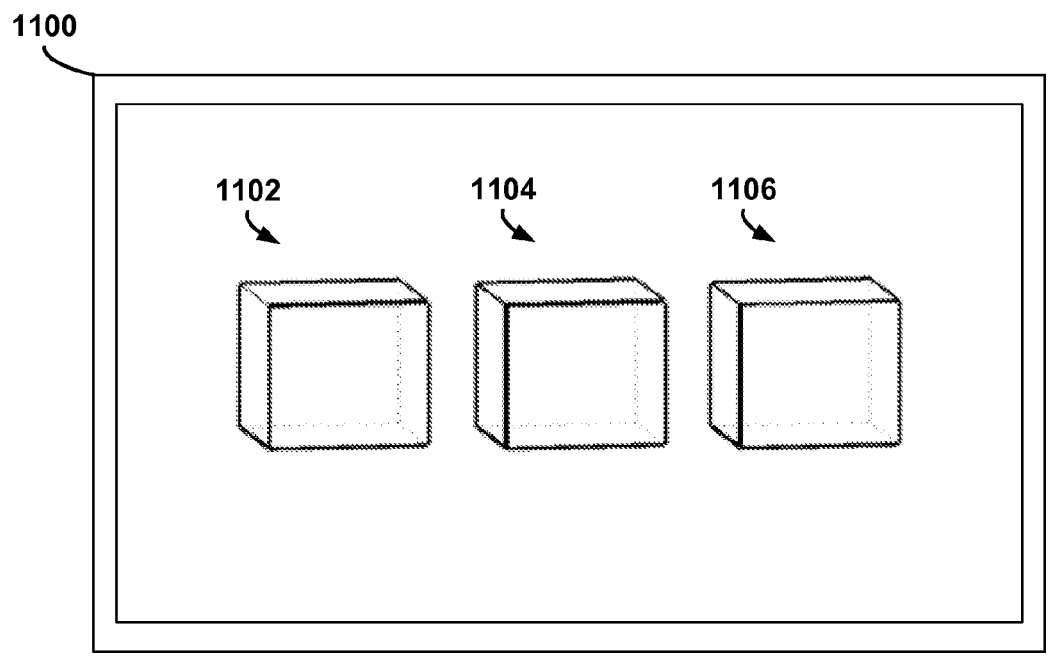
FIGS. 11A and 11B show example displays of multiple three-dimensional (3D) object data models.
Figure 11B:
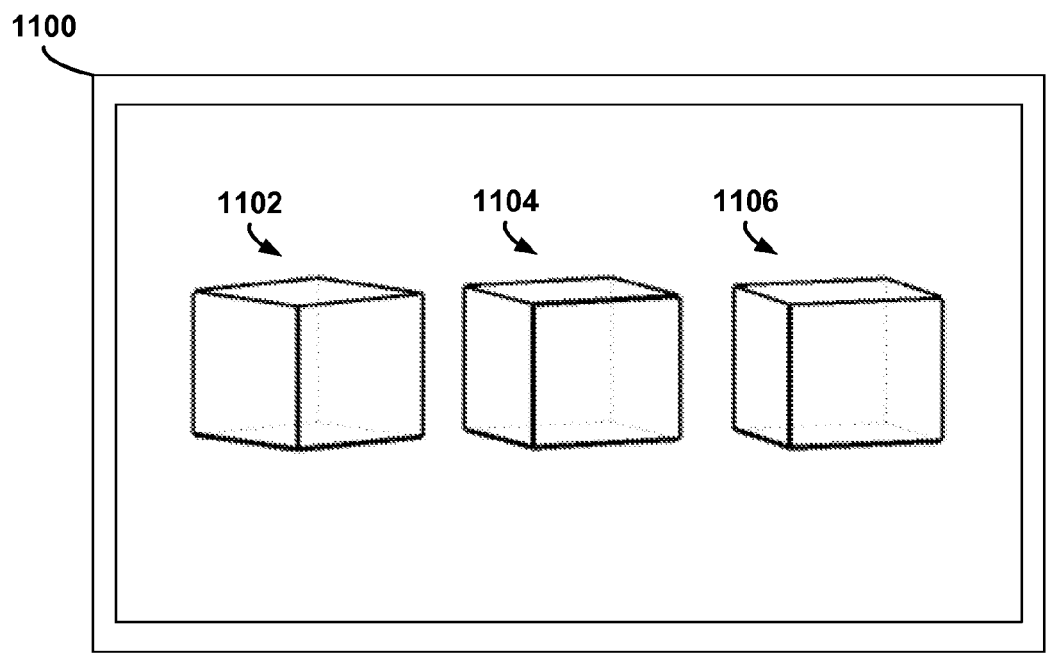

FIGS. 11A and 11B show example displays of multiple three-dimensional (3D) object data models. In one example, the example displays may be provided on a portion of the display device 1002 of FIG. 10, for example. As shown in FIGS. 11A and 11B, the example displays may include a window 1100 that is presented on a display device. Three 3D object data models 1102, 1104, and 1106 may be provided within the window 1100.

In one example, the three 3D object data models 1102, 1104, and 1106 may be aligned based on a correspondence between orientations of each of the 3D object data models. As shown in FIG. 11A, at a first instance in time, the three 3D object data models 1102, 1104, and 1106 may all be aligned in the same pose or orientation. A user may perform a gesture to provide a modification to the 3D object data model 1104 (or provide a modification via another input interface). For instance, the user may wave their hand to the left to cause the 3D object data model 1104 to rotate the pose of the 3D object data model 1104 to the left.

As shown in FIG. 11B, at a second instance in time that is later than the first instance in time, the orientations of the three 3D object data models 1102, 1104, and 1106 may be rotated to the left. In one example, the 3D object data model 1102 and the 3D object data model 1106 may rotate less or more than the 3D object data model 1104. For example, a viewpoint of the display device may be determined (e.g., a position of a user's head), and perspective-based transforms for the 3D object data model 1102 and 1106 may be determined based on positions of the 3D object data model 1102 and 3D object data model 1106 with respect to the viewpoint position.

As an example, the viewpoint position may be in front of the center of the window 1100, and the perspective-based transform may specify an amount of rotation for the 3D object data model 1102 and the 3D object data model 1106 based on the viewpoint position. For instance, the 3D object data model 1102 may rotate less than the 3D object data model 1104 while the 3D object data model 1106 may rotate more than the 3D object data model 1104, such that when viewed from the viewpoint position, the three 3D object data models 1102, 1104, and 1106 each appear to have the same orientation. Thus, the perspective-based transform may create the illusion when viewed from the viewpoint position that the three 3D object data models 1102, 1104, and 1106 each have rotated by the same amount.

In other examples, amounts of rotation applied to the 3D object data models 1102, 1104, and 1106 may not depend on a viewpoint position. For instance, other 3D object data models may be rendered according to an orthographic transform in which each of the 3D object data models are rotated by the same amount that a first 3D object data model is rotated. In yet another example, multiple 3D object data models may be rotated by an amount of rotation that is determined based on a non-physically realistic transform. For instance, other 3D object data models may rotate in an opposite direction than a direction of rotation that is determined based on a modification of a first 3D object data model, such that the first 3D object data model is emphasized while the other 3D object data models turn away. Other example transforms for determining an amount of rotation applied to other 3D object data models based on a modification to one 3D object data model are also possible.

Figure 12:
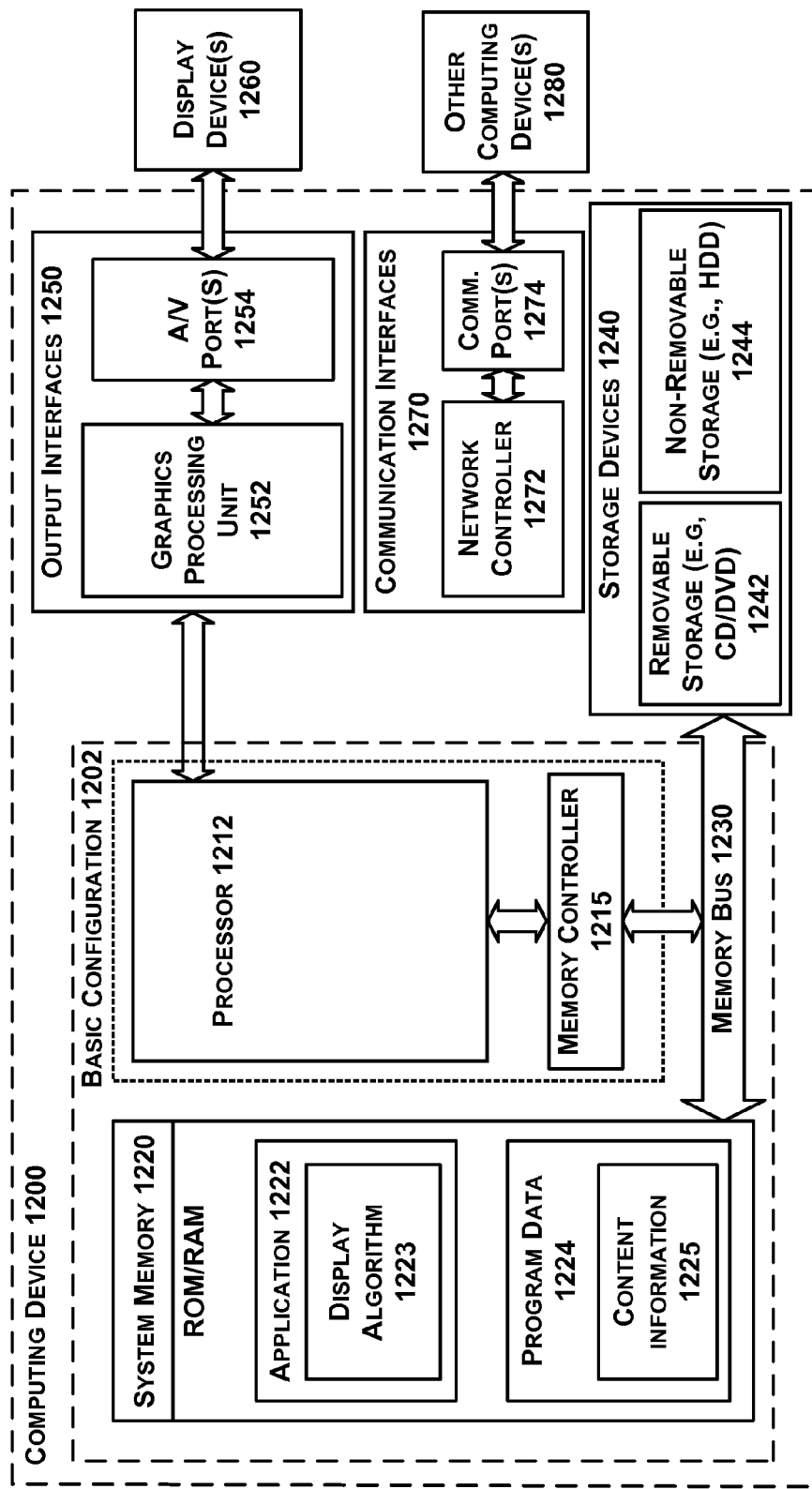
FIG. 12 is a functional block diagram illustrating an example computing device used in a computing system that is arranged in accordance with at least some embodiments described herein.

FIG. 12 is a functional block diagram illustrating an example computing device 1200 used in a computing system that is arranged in accordance with at least some embodiments described herein. The computing device 1200 may be a personal computer, mobile device, cellular phone, touch-sensitive wristwatch, tablet computer, video game system, or global positioning system, and may be implemented to provide a system for providing a three-dimensional (3D) image viewer in a webpage as described in FIGS. 1-11B. In a basic configuration 1202, computing device 1200 may typically include one or more processors 1210 and system memory 1220. A memory bus 1230 can be used for communicating between the processor 1210 and the system memory 1220. Depending on the desired configuration, processor 1210 can be of any type including but not limited to a microprocessor (µP), a microcontroller (µC), a digital signal processor (DSP), or any combination thereof. A memory controller 1215 can also be used with the processor 1210, or in some implementations, the memory controller 1215 can be an internal part of the processor 1210.

Depending on the desired configuration, the system memory 1220 can be of any type including but not limited to volatile memory (such as RAM), non-volatile memory (such as ROM, flash memory, etc.) or any combination thereof. System memory 1220 may include one or more applications 1222, and program data 1224. Application 1222 may include a display algorithm 1223 that is arranged to provide inputs to the electronic circuits, in accordance with the present disclosure. Program data 1224 may include 3D information 1225 that could be directed to any number of types of data. In some example embodiments, application 1222 can be arranged to operate with program data 1224 on an operating system.

Computing device 1200 can have additional features or functionality, and additional interfaces to facilitate communications between the basic configuration 1202 and any devices and interfaces. For example, data storage devices 1240 can be provided including removable storage devices 1242, non-removable storage devices 1244, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 1220 and storage devices 1240 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media can be part of computing device 1200.

Computing device 1200 can also include output interfaces 1250 that may include a graphics processing unit 1252, which can be configured to communicate to various external devices such as display devices 1260 or speakers via one or more A/V ports or a communication interface 1270. The communication interface 1270 may include a network controller 1272, which can be arranged to facilitate communications with one or more other computing devices 1280 over a network communication via one or more communication ports 1274. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 1200 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1200 can also be implemented as a personal computer including both laptop computer and non-laptop computer configurations.

Figure 13:
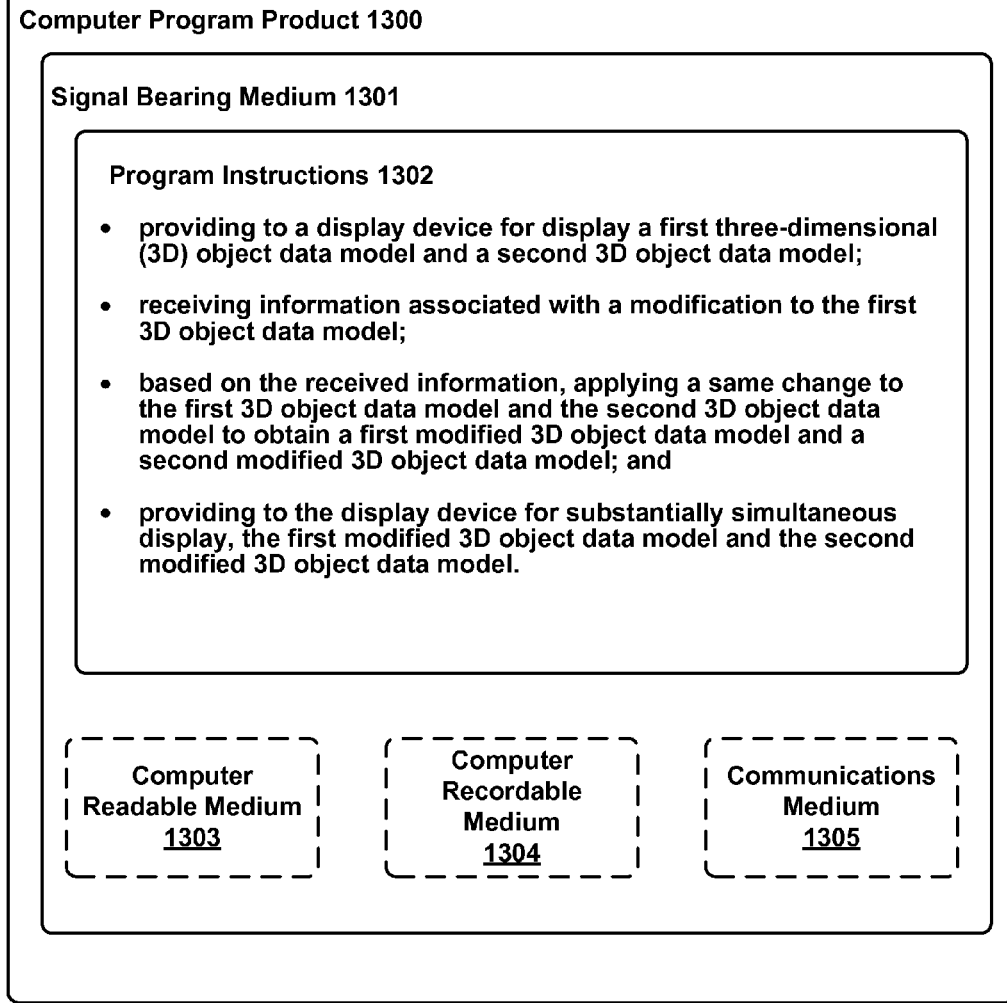
FIG. 13 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 13 is a schematic illustrating a conceptual partial view of an example computer program product 1300 that includes a computer program for executing a computer process on a computing device, arranged according to at least some embodiments presented herein.

In one embodiment, the example computer program product 1300 is provided using a signal bearing medium 1301. The signal bearing medium 1301 may include one or more programming instructions 1302 that, when executed by one or more processors may provide functionality or portions of the functionality described above with respect to FIGS. 1-11B. In some examples, the signal bearing medium 1301 may encompass a computer-readable medium 1303, such as, but not limited to, a hard disk drive, a Compact Disc (CD), a Digital Video Disk (DVD), a digital tape, memory, etc. In some implementations, the signal bearing medium 1301 may encompass a computer recordable medium 1304, such as, but not limited to, memory, read/write (R/W) CDs, R/W DVDs, etc. In some implementations, the signal bearing medium 1301 may encompass a communications medium 1305, such as, but not limited to, a digital and/or an analog communication medium (e.g., a fiber optic cable, a waveguide, a wired communications link, a wireless communication link, etc.). Thus, for example, the signal bearing medium 1301 may be conveyed by a wireless form of the communications medium 1305 (e.g., a wireless communications medium conforming with the IEEE 802.11 standard or other transmission protocol).

The one or more programming instructions 1302 may be, for example, computer executable and/or logic implemented instructions. In some examples, a computing device such as the computing device 1200 of FIG. 12 may be configured to provide various operations, functions, or actions in response to the programming instructions 1302 conveyed to the computing device 1200 by one or more of the computer readable medium 1303, the computer recordable medium 1304, and/or the communications medium 1305.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method for three-dimensional (3D) model manipulation, comprising:
   providing to a display device for display, by one or more computing devices, within a 3D image viewer a first 3D object data model and a second 3D object data model, wherein the 3D image viewer includes an input interface configured to receive input for individually modifying a particular display of the first 3D object data model or the second 3D object data model;
   receiving, by the one or more computing devices, via the input interface data indicative of an individual modification to a display property of the first 3D object data model; and
   in response to receiving the data indicative of the individual modification:
     modifying, by the one or more computing devices, the display property of the first 3D object data model and a corresponding display property of the second 3D object data model, and
     providing, by the one or more computing devices, substantially simultaneously to the display device a modified display of the first 3D object data model and a modified display of the second 3D object data model.

2. The method of claim 1, wherein a correspondence exists between a set of points of a surface of the first 3D object data model and a set of points of a surface of the second 3D object data model, and wherein a pose of the first 3D object data model and a pose of the second 3D object data model are aligned based on the correspondence.

3. The method of claim 1, further comprising providing to the display device for display within a common 3D scene the first 3D object data model and the second 3D object data model.

4. The method of claim 1, wherein the display property comprises a display property selected from the group consisting of: a pose, a level of zoom, an aspect ratio, a texture, a lighting attribute, an animation sequence, and a background.

5. The method of claim 1, wherein the first 3D object data model and the second 3D object data model comprise multiple instances of one or more products.

6. The method of claim 5, further comprising:
providing, by the one or more computing devices, a list of products for comparison; and
providing the first 3D object data model and the second 3D object data model to the display device for display within the 3D image viewer in response to receiving data indicative of a selection of a first instance of a product and a second instance of a product.

7. The method of claim 1, wherein modifying the display property of the first 3D object data model and the corresponding display property of the second 3D object data model in response to receiving the data indicative of the individual modification comprises:
providing the data indicative of the individual modification to a communication module; and
providing, by the communication module, the data indicative of the individual modification to one or more rendering components that are configured to control rendering of the first 3D object data model and the second 3D object data model.

8. The method of claim 1, wherein modifying the display property of the first 3D object data model and the corresponding display property of the second 3D object data model comprises simultaneously:
providing instructions to a first rendering component for determining the modified display of the first 3D object data model, and
providing instructions to a second rendering component for determining the modified display of the second 3D object data model.

9. The method of claim 1, wherein the data indicative of the individual modification comprises an amount of rotation of the first 3D object data model, and wherein the method further comprises determining, by the one or more computing devices, a corresponding amount of rotation to apply to the second 3D object data model based on (i) a viewpoint position from which the display device is being viewed and (ii) a perspective-based transform that is a function of a position of the second 3D object data model on the display device and the viewpoint position.

10. The method of claim 1, wherein the data indicative of the individual modification comprises an amount of rotation of the first 3D object data model, and wherein the method further comprises determining, by the one or more computing devices, a corresponding amount of rotation to apply to the second 3D object data model based on a non-physically realistic transform, wherein the corresponding amount of rotation to apply to the second 3D object data model comprises a rotation in the opposite direction as the amount of rotation of the first 3D object data model.

11. The method of claim 1, wherein the 3D image viewer is embedded within a webpage.

12. A non-transitory computer-readable medium having stored therein instructions, that when executed by one or more computing devices, cause the one or more computing devices to perform functions comprising:
providing for display within a three-dimensional (3D) image viewer a first 3D object data model and a second 3D object data model, wherein the 3D image viewer includes an input interface configured to receive input for individually modifying a particular display of the first 3D object data model or the second 3D object data model;
receiving via the input interface data indicative of an individual modification to a display property of the first 3D object data model; and
in response to receiving the data indicative of the individual modification:
modifying the display property of the first 3D object data model and a corresponding display property of the second 3D object data model, and
providing substantially simultaneously for display within the 3D image viewer a modified display of the first 3D object data model and a modified display of the second 3D object data model.

13. The non-transitory computer-readable medium of claim 12, wherein a correspondence exists between a set of points of a surface of the first 3D object data model and a set of points of a surface of the second 3D object data model, and wherein a pose of the first 3D object data model and a pose of the second 3D object data model are aligned based on the correspondence.

14. The non-transitory computer-readable medium of claim 12, wherein the first 3D object data model and the second 3D object data model comprise multiple instances of one or more products.

15. The non-transitory computer-readable medium of claim 12, wherein modifying the display property of the first 3D object data model and the corresponding display property of the second 3D object data model comprises simultaneously:
providing instructions to a first rendering component for determining the modified display of the first 3D object data model, and
providing instructions to a second rendering component for determining the modified display of the second 3D object data model.

16. The non-transitory computer-readable medium of claim 12, wherein modifying the display property of the first 3D object data model and the corresponding display property of the second 3D object data model in response to receiving the data indicative of the individual modification comprises:
providing the data indicative of the individual modification to a communication module; and
providing, by the communication module, the data indicative of the individual modification to one or more rendering components that are configured to control rendering of the first 3D object data model and the second 3D object data model.

17. The non-transitory computer-readable medium of claim 12, wherein the display property comprises a display property selected from the group consisting of: a pose, a level of zoom, an aspect ratio, a texture, a lighting attribute, an animation sequence, and a background.

18. A system for three-dimensional (3D) model manipulation, comprising:
one or more processors; and
a computer-readable medium, configured to store instructions, that when executed by the one or more processors, cause the system to perform functions comprising:
providing for display within a three-dimensional (3D) image viewer a first 3D object data model and a second 3D object data model, wherein the 3D image viewer includes an input interface configured to receive input for individually modifying a particular display of the first 3D object data model or the second 3D object data model;
receiving via the input interface data indicative of an individual modification to a display property of the first 3D object data model; and
in response to receiving the data indicative of the individual modification:

modifying the display property of the first 3D object data model and a corresponding display property of the second 3D object data model, and providing substantially simultaneously for display within the 3D image viewer a modified display of the first 3D object data model and a modified display of the second 3D object data model.

19. The system of claim 18, wherein modifying the display property of the first 3D object data model and the corresponding display property of the second 3D object data model comprises simultaneously:

providing instructions to a first rendering component for determining the modified display of the first 3D object data model, and providing instructions to a second rendering component for determining the modified display of the second 3D object data model.

20. The system of claim 18, wherein modifying the display property of the first 3D object data model and the corresponding display property of the second 3D object data model in response to receiving the data indicative of the individual modification comprises:

providing the data indicative of the individual modification to a communication module; and providing, by the communication module, the data indicative of the individual modification to one or more rendering components that are configured to control rendering of the first 3D object data model and the second 3D object data model.

* * * * *